W. LIDDELL.
CHECK-REIN HOOK.
No. 186,091. Patented Jan. 9, 1877.
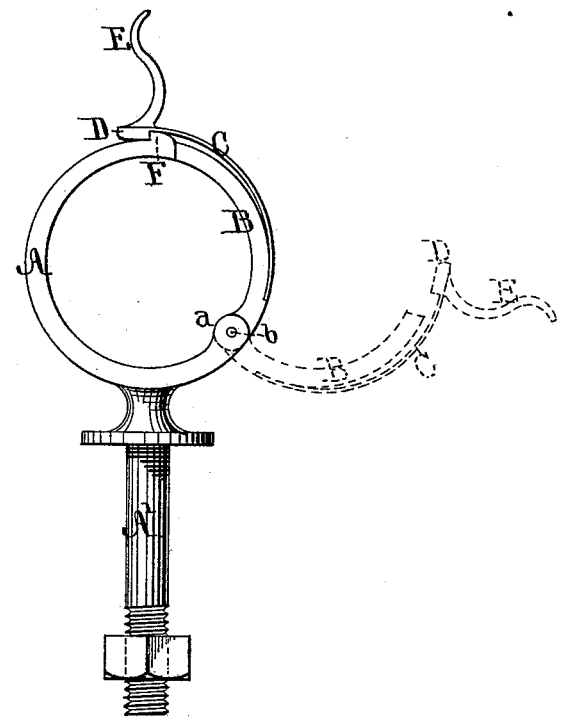
Witnesses.
Madison Coombs
Sarah M. Holbrook
Inventor.
William Liddell

UNITED STATES PATENT OFFICE.

WILLIAM LIDDELL, OF SANDY HILL, NEW YORK.

IMPROVEMENT IN CHECK-REIN HOOKS.

Specification forming part of Letters Patent No. 186,091, dated January 9, 1877; application filed July 28, 1876.

*To all whom it may concern:*

Be it known that I, WILLIAM LIDDELL, of Sandy Hill, in the county of Washington and State of New York, have invented a new and useful Improvement in Check-Rein Hooks, of which the following is a full and exact description, reference being had to the accompanying drawing, making a part of this specification, in which a side view of my improved hook is shown.

My invention relates to the device used upon harness for holding the check-rein for retaining the head of the horse in its proper position; and it consists in constructing the the check-rein hook with a hinged guard-piece for the purpose of preventing the dislodgement of the check-rein from the hook.

The object of my invention is to prevent the accidental unfastening of the check-rein from its hook, and thereby avoiding the dangers and delays incident thereto.

As shown in the drawing, A represents a check-rein hook adapted to my improvement. It may be made of any desirable form and style, and it can be secured to the saddle of the harness by the shank-bolt A', or by any other of the common and well-known means used for the purpose. The lower anterior portion of the hook is formed into a hinge, a, to which the guard-piece B is hinged by the pin b. This guard-piece is provided with a spring, C, which is secured thereto, and to which is fixed the catch D and thumb-piece E. The upper anterior portion of the hook has a lip, F, formed thereon, with which the catch D engages for securing the guard-piece in its closed position.

To secure the check-rein in its place in the hook A the hinged guard-piece B is swung up so as to close the opening in the hook, as shown in the drawing. When in this position the catch D is forced, by the spring C, to engage with the lip F. By this means the guard-piece B is securely held in place, so that the two parts conjoined form a continuous unbroken eye or loop, from which the check-rein cannot accidentally escape. To disengage the check-rein, pressure is applied to the thumb-piece E, whereby the spring C and catch D are raised sufficiently to release the catch from the lip F, whereupon the guard-piece may be thrown back into the position indicated by the dotted lines on the drawing, so as to leave a free opening for the removal of the check-rein from the hook.

I claim as my invention—

The check-rein hook A, provided with the hinged guard-piece B, secured by the spring-catch D, and the means herein described for securing the hook to the harness, in the manner and for the purpose specified.

WILLIAM LIDDELL.

Witnesses:
MADISON CORNELL,
SARAH M. HOLBROOK.